United States Patent
Izumi et al.

(10) Patent No.: US 10,476,339 B2
(45) Date of Patent: Nov. 12, 2019

(54) ARMATURE AND METHOD FOR PRODUCING ARMATURE

(71) Applicants: MITSUI HIGH-TEC, INC., Kitakyushu-shi, Fukuoka (JP); ROBERT BOSCH GMBH, Stuttgart (DE)

(72) Inventors: Masahiro Izumi, Fukuoka (JP); Hirokazu Arakawa, Fukuoka (JP); Yusuke Hasuo, Fukuoka (JP); Frank Frister, Korntal-Muenchingen (DE); Achim Neubauer, Sinzheim-Vormberg (DE)

(73) Assignees: MITSUI HIGH-TEC, INC., Fukuoka (JP); ROBERT BOSCH GMBH, Stuttgart (DE)

( * ) Notice: Subject to any disclaimer, the term of this patent is extended or adjusted under 35 U.S.C. 154(b) by 75 days.

(21) Appl. No.: 15/755,302

(22) PCT Filed: Aug. 15, 2016

(86) PCT No.: PCT/JP2016/073860
§ 371 (c)(1),
(2) Date: Feb. 26, 2018

(87) PCT Pub. No.: WO2017/033794
PCT Pub. Date: Mar. 2, 2017

(65) Prior Publication Data
US 2018/0198343 A1    Jul. 12, 2018

(30) Foreign Application Priority Data
Aug. 27, 2015  (JP) ................................ 2015-168117

(51) Int. Cl.
*H02K 47/00*  (2006.01)
*H02K 3/28*  (2006.01)
(Continued)

(52) U.S. Cl.
CPC ............... *H02K 3/28* (2013.01); *H02K 1/148* (2013.01); *H02K 1/18* (2013.01); *H02K 15/022* (2013.01); *H02K 15/0435* (2013.01)

(58) Field of Classification Search
CPC ........ H02K 1/148; H02K 1/18; H02K 15/022; H02K 15/0435
(Continued)

(56) References Cited

U.S. PATENT DOCUMENTS

| 2002/0084716 A1 | 7/2002 | Harter et al. |
| 2002/0093269 A1 | 7/2002 | Harter et al. |

(Continued)

FOREIGN PATENT DOCUMENTS

| EP | 1885043 A | 2/2013 |
| GB | 2310545 A | 6/2001 |

(Continued)

OTHER PUBLICATIONS

Office Action issued in Japan Counterpart Patent Appl. No. 2015-168117, dated Oct. 24, 2017, along with an english translation thereof.

(Continued)

*Primary Examiner* — Thanh Lam
(74) *Attorney, Agent, or Firm* — Greenblum & Bernstein, P.L.C.

(57) ABSTRACT

In a cross sectional plane perpendicular to a center axis line of an annular core, a connection projection and a connection recess have complementary configurations in which the connection projection and the connection recess are narrowed in width with distance from coupling surfaces, the connection projection and the connection recess respectively include a pair of friction surfaces and a pair of friction surfaces extending in a direction separate from the coupling surfaces, the friction surface of the connection projection is (Continued)

inclined relative to a virtual normal line perpendicular to a line connecting bottom portions of the pair of friction surfaces of the connection projection, and the friction surface of the connection recess is inclined relative to a virtual normal line perpendicular to a line connecting bottom portions of the pair of friction surfaces of the connection recess.

8 Claims, 10 Drawing Sheets

(51) Int. Cl.
  *H02K 1/18* (2006.01)
  *H02K 15/04* (2006.01)
  *H02K 1/14* (2006.01)
  *H02K 15/02* (2006.01)

(58) Field of Classification Search
  USPC .................................................. 310/112–114
  See application file for complete search history.

(56) References Cited

U.S. PATENT DOCUMENTS

| | | |
|---|---|---|
| 2002/0125782 A1 | 9/2002 | Peachee et al. |
| 2002/0134118 A1 | 9/2002 | Peachee et al. |
| 2002/0135254 A1 | 9/2002 | Peachee et al. |
| 2002/0135255 A1 | 9/2002 | Williams et al. |
| 2002/0139606 A1 | 10/2002 | Williams et al. |
| 2009/0026872 A1 | 1/2009 | Tomohora et al. |
| 2009/0066183 A1 | 3/2009 | Aramaki et al. |
| 2011/0047780 A1* | 3/2011 | Akita ..................... H02K 1/148 29/527.1 |
| 2012/0019093 A1* | 1/2012 | Maki ..................... H02K 1/148 310/216.013 |
| 2012/0175993 A1* | 7/2012 | Jang ..................... H02K 1/148 310/215 |
| 2014/0145542 A1* | 5/2014 | Kanazawa ............. H02K 1/148 310/203 |
| 2014/0368080 A1* | 12/2014 | Miyajima .............. H02K 1/148 310/216.065 |
| 2017/0077789 A1* | 3/2017 | Jang ..................... H02K 1/185 |

FOREIGN PATENT DOCUMENTS

| | | |
|---|---|---|
| JP | 3306649 | 5/2002 |
| JP | 2004-534493 | 11/2004 |
| JP | 2006-340509 | 12/2006 |
| JP | 2008-253135 | 10/2008 |
| JP | 2010-93997 | 4/2010 |
| JP | 2010-246352 | 10/2010 |
| JP | 4861985 | 11/2011 |

OTHER PUBLICATIONS

Written Opinion of the International Searching Authority received in PCT/JP2016/073860, dated Sep. 6, 2016, along with an english translation thereof.
International Search Report received in PCT/JP2016/073860, dated Sep. 6, 2016 , along with an english translation thereof.
Extended European Search Report received in EP Application No. 16839141.5. dated Feb. 14, 2019.

* cited by examiner

ARMATURE AND METHOD FOR PRODUCING ARMATURE

TECHNICAL FIELD

The present invention relates to an armature and a method for producing the armature.

BACKGROUND ART

Patent Literature 1 describes a method for producing an annular core used in an armature. Such an annular core is produced through the following steps.
(1) A plurality of split iron core pieces are prepared.
(2) In a die unit, the plurality of split iron core pieces are formed in an annularly arranged state, the split iron core pieces are further laminated on the annularly arranged split iron core pieces, an annular intermediate body with split cores annularly connected is formed, and the intermediate body is ejected from the die unit. (3) For example, dimensional accuracy of the intermediate body ejected from the die unit is inspected, and when necessary, heat treatment is performed. (4) Each of the split cores is decoupled to disconnect the intermediate body. A winding wire is wound on each of the obtained split cores. (5) The split cores with the winding wires wound are annularly reassembled to obtain the annular core.

CITATION LIST

Patent Literature

Patent Literature 1: JP-A-2010-093997
Patent Literature 2: Japanese Patent No. 3306649
Patent Literature 3: Japanese Patent No. 4861985

SUMMARY OF INVENTION

Solution to Problem

Incidentally, both end faces of each of the split cores in a circumferential direction are formed as coupling surfaces. With the split cores annularly connected, the coupling surfaces of the adjacent split cores abut on each other. Patent Literature 2 and Patent Literature 3 disclose that the coupling surfaces of the split cores are formed with bulged portions, constricted portions or protruding portions and these portions are elastically fitted, thereby increasing the strength of connection between the split cores.

The inventors have considered a required strength of connection between the split cores in the armature produced through the above steps (1) to (5).

The steps (2) and (3) require the strength of connection of the extent to which the split cores are not decoupled by an external force acting at the time of ejecting the intermediate body from the die unit, or an external force acting at the time of conveying or inspecting the intermediate body. Consequently, the strength of connection is preferably high.

However, since the step (4) needs to decouple the split cores, workability is decreased when the strength of connection is too high. Thus, the inventors have found that production efficiency of the armature cannot be increased by simply increasing the strength of connection.

Accordingly, an object of the present invention is to provide an armature with increased production efficiency, and a method for producing the armature.

Technical Solution

An armature according to an aspect of the present invention is
an armature for an electric motor or a generator, the armature including:
a plurality of split cores mutually connected to form an annular core; and
a winding wire wound on each of the split cores,
wherein a connection projection and a connection recess are formed on coupling surfaces located on both ends of each of the split cores in a circumferential direction to mutually connect adjacent ones of the split cores, and
wherein, in a cross sectional plane perpendicular to a center axis line of the annular core:
the connection projection and the connection recess have complementary configurations in which the connection projection and the connection recess are narrowed in width with distance from the coupling surfaces;
each of the connection projection and the connection recess includes a pair of friction surfaces extending in a direction separate from the coupling surfaces;
at least one of the pair of friction surfaces of the connection projection is inclined relative to a virtual normal line that is perpendicular to a line connecting bottom portions of the pair of friction surfaces of the connection projection; and
at least one of the pair of friction surfaces of the connection recess is inclined relative to a virtual normal line that is perpendicular to a line connecting bottom portions of the pair of friction surfaces of the connection recess.

According to the armature according to the aspect of the present invention, the connection projection and the connection recess have the complementary configurations in which the connection projection and the connection recess are narrowed in width with distance from the coupling surfaces, and at least one of the friction surfaces is inclined relative to the virtual normal line. This does not decouple the split cores unless the split core is moved in a determined direction. Also, a force of friction between the friction surfaces can obtain an adequate strength of connection. This resists decoupling the split cores even when an unintended external force is applied, for example, at the time of ejection from a die unit, or during conveyance or inspection.

Also, according to the armature according to the aspect of the present invention, the connection projection and the connection recess have the complementary configurations in which the connection projection and the connection recess are narrowed in width with distance from the coupling surfaces, and at least one of the friction surfaces is inclined relative to the virtual normal line. This can easily decouple the split cores without interference between the friction surfaces by moving the split core in the determined direction. When the split core is moved in a direction opposite to the direction in the case of decoupling the split cores, the split cores can easily be connected to assemble the annular core. Further, in the aspect of the present invention, a state of connection between the split cores is not maintained by mesh of the mutual friction surfaces, inclined relative to the virtual normal line, of the connection projection and the connection recess. In the aspect of the present invention, the state of connection between the split cores is maintained by the force of friction between the friction surfaces. This can easily decouple the split cores and assemble the annular core.

Thus, the armature according to the aspect of the present invention can easily maintain the state of connection between the split cores, and can easily decouple the split cores and assemble the annular core.

In the armature according to the aspect of the present invention, one of the pair of friction surfaces of the connection projection is inclined relative to the virtual normal line that is perpendicular to the line connecting bottom portions of the pair of friction surfaces of the connection projection, the other of the pair of friction surfaces of the connection projection is parallel to the virtual normal line, one of the pair of friction surfaces of the connection recess is inclined relative to the virtual normal line, and the other of the pair of friction surfaces of the connection recess is parallel to the virtual normal line.

According to the armature according to the aspect of the present invention, the connection projection can be disconnected from the connection recess by moving the split core along one of the pair of the friction surfaces of the connection projection or the connection recess, but movement of the split core along the other of the pair of the friction surfaces is inhibited by interference between the friction surfaces or action of a force of friction between the friction surfaces. Accordingly, the direction in which the split cores are disconnected is determined. This can easily maintain the state of connection between the split cores.

In the armature according to the aspect of the present invention, the friction surface inclined relative to the virtual normal line is inclined steeper toward an outer diameter side or an inner diameter side of the annular core with distance from the coupling surfaces of the connection projection and the connection recess.

According to the armature according to the aspect of the present invention, when the friction surface inclined relative to the virtual normal line is inclined steeper toward the outer diameter side of the annular core, the split cores can easily be decoupled by rotating the split core around the center of rotation located outside an outer peripheral surface of the annular core.

Also, when the friction surface inclined relative to the virtual normal line is inclined steeper toward the inner diameter side of the annular core, the split cores can easily be decoupled by rotating the split core around the center of rotation located inside an inner peripheral surface of the annular core.

In the armature according to the aspect of the present invention, the friction surface inclined relative to the virtual normal line is formed of a flat surface.

According to the armature according to the aspect of the present invention, the friction surface is easily processed, and the friction surface can be formed with a low cost and a high accuracy.

In the armature according to the aspect of the present invention, the friction surface inclined relative to the virtual normal line is formed of a curved surface.

According to the armature according to the aspect of the present invention, the split cores resist interfering with each other at the time of rotating the split core and decoupling the split cores.

In the armature according to the aspect of the present invention, the friction surface inclined relative to the virtual normal line is formed of a circular arc, and in the cross sectional plane perpendicular to the center axis line of the annular core, a center of the circular arc is located at: a radial end of the coupling surface or a place separated from the radial end of the coupling surface away from the connection projection and the connection recess along a radial direction of the annular core; and the coupling surface or a place separated from the coupling surface away from the connection projection and the connection recess along a circumferential direction of the annular core.

When the center of the circular arc is located in a position overlapping with the annular core, the split cores may interfere with each other at the time of rotating the split core and decoupling the split cores. However, according to the armature according to the aspect of the present invention, the center of the circular arc is located at the place separated from the annular core. Consequently, at the time of rotating the split core, the split cores do not interfere with each other, and the split cores can easily be decoupled.

In the armature according to the aspect of the present invention, the friction surface having a circular arc shape is located in an inner diameter side of the pair of friction surfaces, and in the cross sectional plane perpendicular to the center axis line of the annular core, a center of the friction surface is located outside an outer-diameter end of the coupling surface along the radial direction of the annular core and a place separated from the coupling surface away from the connection projection and the connection recess along a circumferential direction of the annular core.

According to the armature according to the aspect of the present invention, the outer diameter side of the annular core has large working space. This provides good workability at the time of decoupling the split cores.

A method for producing an armature according to an aspect of the present invention is a method for producing an armature for an electric motor or a generator including a plurality of split cores mutually connected to form an annular core, the method including the steps of:

connecting a connection projection and a connection recess formed on coupling surfaces located on both ends of each of the split cores in a circumferential direction to the connection recess and the connection projection of an adjacent one of the split cores in a die unit, thereby obtaining a first intermediate body in which the split cores are annularly connected;

removing the first intermediate body from the die unit;

disconnecting the connection projection from the connection recess in adjacent ones of the split cores and decoupling the split cores;

winding a wire on each of the decoupled split cores; and inserting the connection projection of each of the split cores into the connection projection of the adjacent one of the split cores to reconnect the split cores, thereby obtaining the annular core, wherein, in a cross sectional plane perpendicular to a center axis line of the annular core:

the connection projection and the connection recess have complementary configurations in which the connection projection and the connection recess are narrowed in width with distance from the coupling surfaces;

each of the connection projection and the connection recess includes a pair of friction surfaces extending in a direction separate from the coupling surfaces;

at least one of the pair of friction surfaces of the connection projection is inclined relative to a virtual normal line that is perpendicular to a line connecting bottom portions of the pair of friction surfaces of the connection projection; and at least one of the pair of friction surfaces of the connection recess is inclined relative to a virtual normal line that is perpendicular to a line connecting bottom portions of the pair of friction surfaces of the connection recess.

According to the method for producing the armature according to the aspect of the present invention, the split cores have the complementary configurations in which the connection projection and the connection recess are narrowed in width with distance from the coupling surfaces, and at least one of the friction surfaces is inclined relative to the virtual normal line. This resists decoupling the split cores unless the split core is moved in the determined direction. Also, the split cores have the complementary configurations in which the connection projection and the connection recess are narrowed in width with distance from the coupling surfaces, and at least one of the friction surfaces is inclined relative to the virtual normal line. This can easily decouple the split cores without interference between the friction surfaces by moving the split core in the determined direction. Further, when the split core is moved in a direction opposite to the direction in the case of decoupling the split cores, the split cores can easily be assembled.

Accordingly even when an unintended external force is applied at the time of removal from the die unit, the split cores resist being decoupled, and the split cores can easily be decoupled and coupled by moving the split core in the determined direction. This can increase production efficiency of the armature.

Advantageous Effects of Invention

The present invention can provide the armature with increased production efficiency, and the method for producing the armature.

DESCRIPTION OF EMBODIMENTS

Examples of an embodiment of an armature and a method for producing the armature according to the present invention will hereinafter be described with reference to the drawings. The present invention is not limited to these illustrations, but is expressed by the claims, and is intended to include all the changes within the scope and meaning equivalent to the claims.

Figure 1:
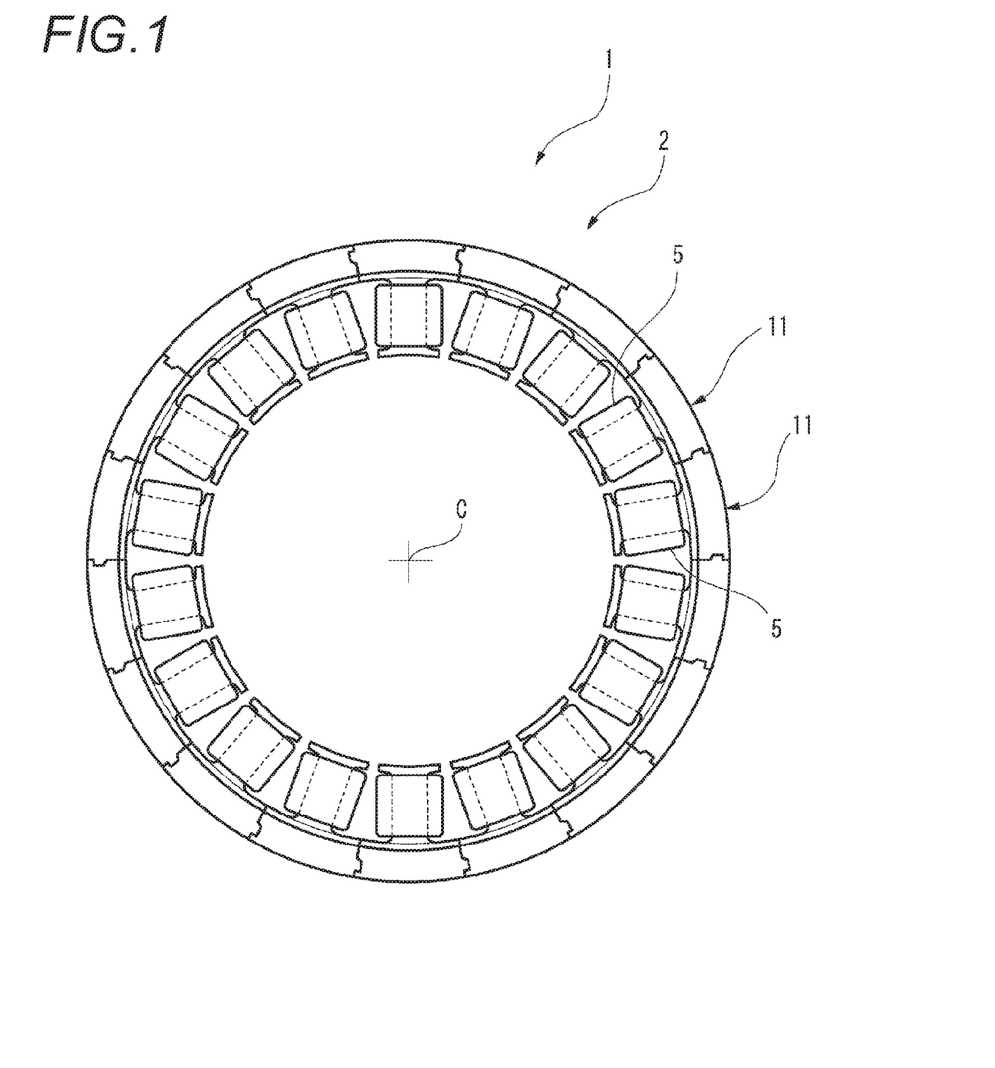
FIG. 1 is a plan view showing an armature according to an embodiment of the present invention.

FIG. 1 is a plan view showing an armature 1 according to an embodiment of the present invention.

As shown in FIG. 1, the armature 1 according to the embodiment has an annular core 2. The armature 1 forms an electric motor or a generator together with a rotor (not shown). The armature 1 may include, for example, a housing for receiving the annular core 2, in addition to the annular core 2. The annular core 2 has a plurality of split cores 11. The plurality of split cores 11 are mutually connected to form the annular core 2. A winding wire 5 is wound on each of the split cores 11.

Figure 2:
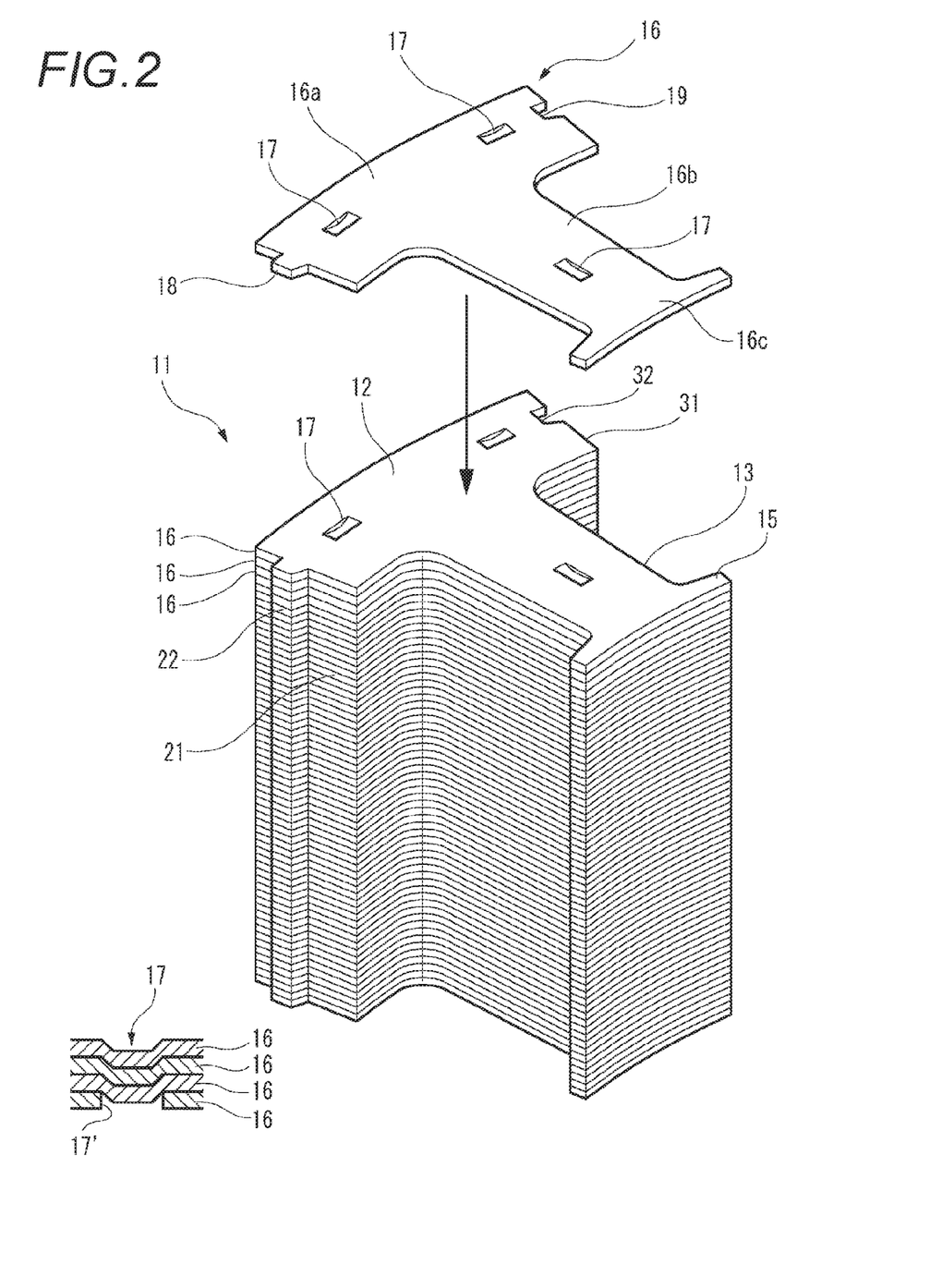
FIG. 2 is a perspective view of a split core.

FIG. 2 is a perspective view of the split core 11.

As shown in FIG. 2, the split core 11 is formed by laminating a plurality of split iron core pieces 16 and mutually caulking the split iron core pieces 16. The split iron core piece 16 can be formed by blanking, for example, an electromagnetic steel plate. The illustrated split iron core piece 16 is a plate-shaped member with substantially a T shape in plan view.

The split iron core piece 16 has caulking portions 17 with the projected back and the recessed front. As shown by a schematic sectional view in the left lower portion of FIG. 2, another split iron core piece 16 is laminated in a thickness direction (vertical direction in FIG. 2) of the split iron core piece 16, and is caulked. Then, the caulking portion 17 of the split iron core piece 16 located on the lower side is fitted into the caulking portion 17 of the split iron core piece 16 located on the upper side to mutually fix the split iron core pieces 16. In addition, the split iron core piece 16 of the lowest layer has a through hole 17' in a position corresponding to the caulking portion 17 of the split iron core piece 16 located on the upper side. The caulking portion 17 of the split iron core piece 16 located on the upper side is fitted into the through hole 17'.

The split iron core piece 16 integrally has a head portion 16a with substantially a circular arc shape in plan view, a shaft portion 16b extending from the head portion 16a toward the center of the circular arc, and a leg portion 16c formed on the end of the shaft portion 16.

The split core 11 integrally has a yoke portion 12 with substantially a circular arc shape in plan view, a tooth portion 13 extending toward the center of the circular arc, and a pole tooth 15 formed on the top of the tooth portion 13. The winding wire 5 is wound on the tooth portion 13.

The head portions 16a of the plurality of laminated split iron core pieces 16 form the yoke portion 12. The shaft portions 16b of the plurality of laminated split iron core pieces 16 form the tooth portion 13. The leg portions 16c of the plurality of laminated split iron core pieces 16 form the pole tooth 15. The yoke portions 12 of the respective split cores 11 are mutually coupled to form the annular core 2.

Figure 3:
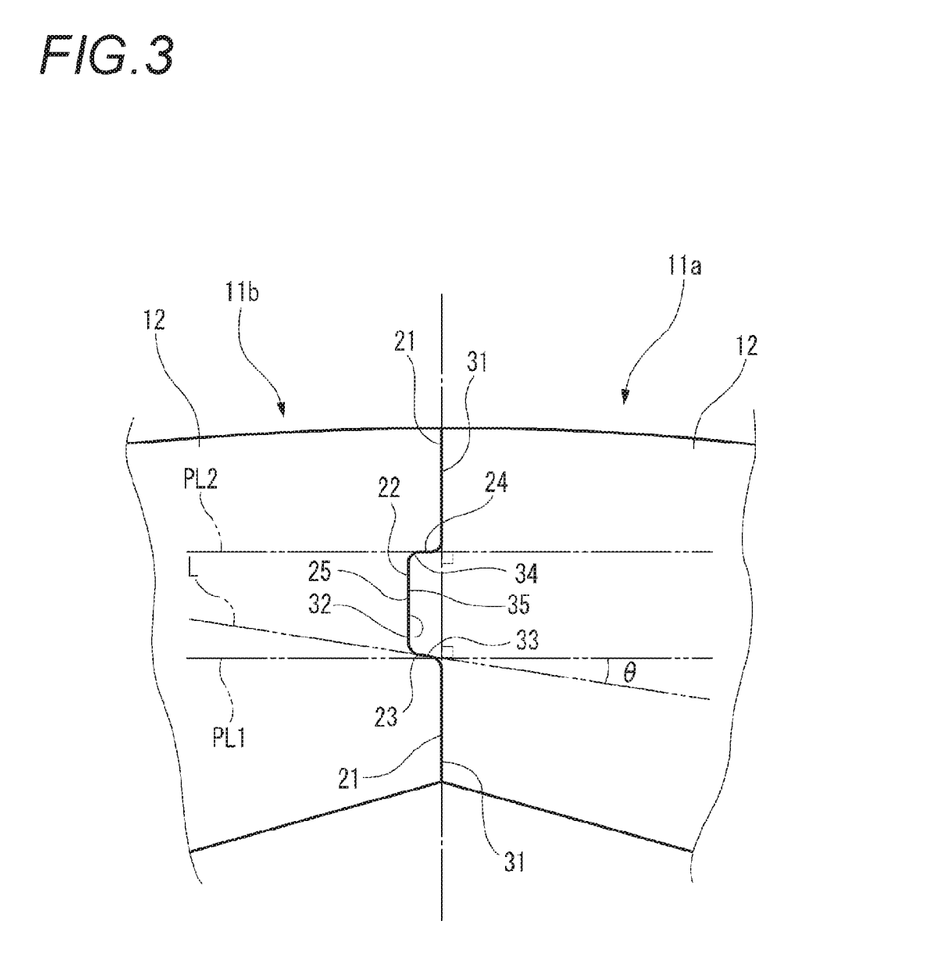
FIG. 3 is an enlarged plan view of a place of connection between the split cores.

FIG. 3 is an enlarged plan view of a place of connection between the split cores 11. As shown in FIG. 3, end faces of the yoke portion 12 with the circular arc shape in a circumferential direction form coupling surfaces 21, 31. The coupling surface 21 of a split core 11a is formed with a connection projection 22, and the coupling surface 31 of a split core 11b adjacent to the split core 11a is formed with a connection recess 32.

FIG. 3 shows the place of connection between the split cores 11 in a cross sectional plane perpendicular to a center axis line C (see FIG. 1) of the annular core 2. In this cross sectional plane of FIG. 3, the connection projection 22 and the connection recess 32 have complementary configurations in which the connection projection 22 and the connection recess 32 are narrowed in width with distance from the coupling surfaces 21, 31.

Here, the configuration in which the connection projection 22 is narrowed in width with distance from the coupling surfaces 21, 31 refers to a configuration in which a region outwardly projected from the coupling surface 21 is tapered in the cross sectional plane of FIG. 3. The configuration in which the connection recess 32 is narrowed in width with distance from the coupling surface 31 refers to a configuration in which a region inwardly recessed from the coupling surface 31 is tapered in the cross sectional plane of FIG. 3.

The connection projection 22 includes a pair of friction surfaces 23, 24 extending in a direction separate from the coupling surface 21. Hereinafter, the friction surface near to the center axis line C of the annular core 2 is called a first inside friction surface 23, and the friction surface far from the center axis line C of the annular core 2 is called a first outside friction surface 24. The distal end of the first inside friction surface 23 is connected to the distal end of the first outside friction surface 24 by an abutment surface 25.

The connection recess 32 includes a pair of friction surfaces 33, 34 extending in a direction separate from the coupling surface 31. Hereinafter, the friction surface near to the center axis line C of the annular core 2 is called a second inside friction surface 33, and the friction surface far from the center axis line C of the annular core 2 is called a second outside friction surface 34. The proximal end of the second inside friction surface 33 is connected to the proximal end of the second outside friction surface 34 by a bottom surface 35.

In the embodiment, all of the first inside friction surface 23, the first outside friction surface 24, the second inside friction surface 33 and the second outside friction surface 34 are formed of flat surfaces.

The first inside friction surface 23 is connected to the coupling surface 21 in a smooth circular arc state, and the first outside friction surface 24 is connected to the coupling surface 21 in a smooth circular arc state. The first inside friction surface 23 is connected to the abutment surface 25 in a smooth circular arc state, and the first outside friction surface 24 is connected to the abutment surface 25 in a smooth circular arc state.

Similarly the second inside friction surface 33 is connected to the coupling surface 31 in a smooth circular arc state, and the second outside friction surface 34 is connected to the coupling surface 31 in a smooth circular arc state. The second inside friction surface 33 is connected to the bottom surface 35 in a smooth circular arc state, and the second outside friction surface 34 is connected to the bottom surface 35 in a smooth circular arc state.

All the friction surfaces 23, 24, 33, 34 in the embodiment refer to regions having the flat surface shapes excluding regions having the circular arc shapes.

In FIG. 3, a straight line that passes through a bottom portion of the first inside friction surface 23 and is perpendicular to a line connecting bottom portions of the pair of friction surfaces 23, 24 including the bottom portion of the first inside friction surface 23 and the bottom portion of the first outside friction surface 24 is defined as a first virtual normal line PL1.

Also, a straight line that passes through a bottom portion of the first outside friction surface 24 and is perpendicular to a line connecting the bottom portions of the pair of friction surfaces 23, 24 including the bottom portion of the first inside friction surface 23 and the bottom portion of the first outside friction surface 24 is defined as a second virtual normal line PL2. The second virtual normal line PL2 is parallel to the first virtual normal line PL1.

The first inside friction surface 23 is inclined relative to the first virtual normal line PL1. The first outside friction surface 24 is parallel to the second virtual normal line PL2. In addition, a straight line L in FIG. 3 is a straight line extending along the first inside friction surface 23 and the second inside friction surface 33.

The second inside friction surface 33 is inclined relative to the first virtual normal line PL1. An inclination angle θ which the second inside friction surface 33 forms with the first virtual normal line PL1 is set at substantially the same angle as an inclination angle which the first inside friction surface 23 forms with the first virtual normal line PL1.

Also, the second outside friction surface 34 is parallel to the second virtual normal line PL2.

The first inside friction surface 23 is inclined steeper toward an outer diameter side of the annular core 2 with distance from the coupling surface 21 of the connection projection 22. Also, the second inside friction surface 33 is inclined steeper toward the outer diameter side of the annular core 2 with distance from the coupling surface 31 of the connection recess 32.

Next, a method for producing the armature 1 formed as mentioned above will be described.

(Step of Forming Intermediate Body)

Figure 4:
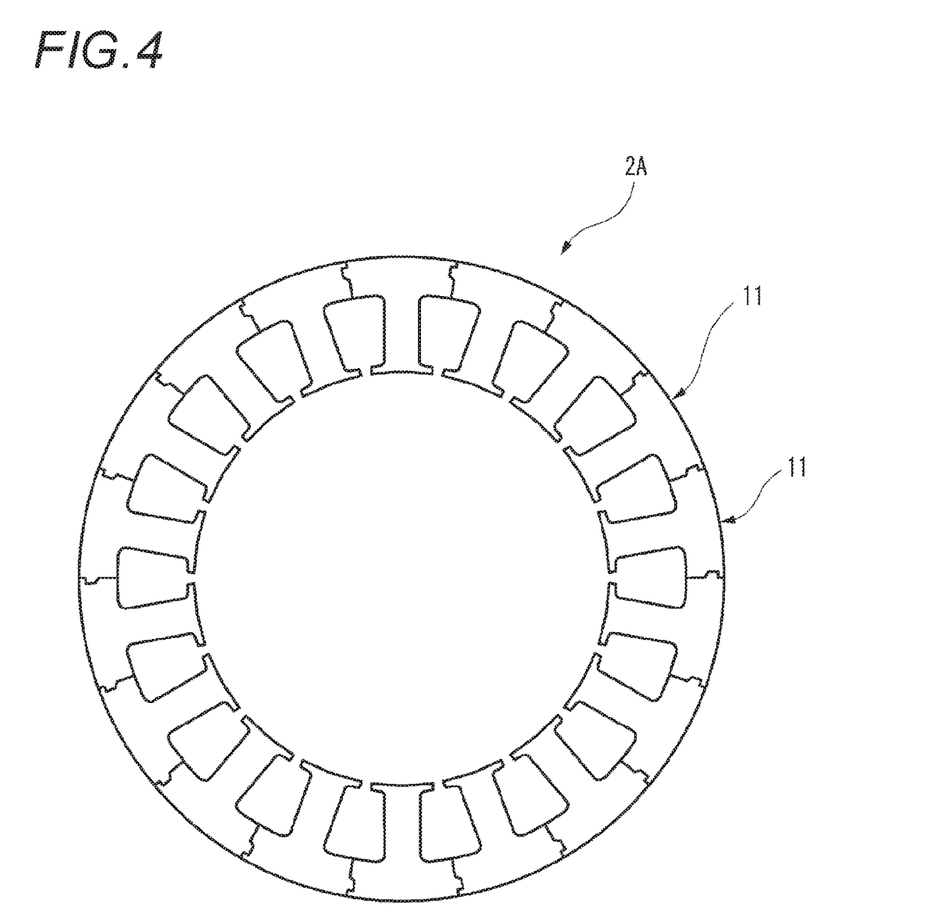
FIG. 4 is a plan view of an intermediate body.

FIG. 4 is a top view of an annular intermediate body 2A.

First, the annular intermediate body 2A as shown in FIG. 4 is formed.

Split iron core pieces 16 in an annularly arranged state are blanked from a plate material, and an annular thin intermediate body including the single-layer split iron core pieces 16 is first formed. The adjacent split iron core pieces 16 are previously cut, for example, by blanking ends of each of the head portions 16a in a circumferential direction and are decoupled in a die and then are again pushed back, thereby obtaining a mutually coupled state. Next, the split iron core pieces 16 are further laminated and arranged on the annularly arranged split iron core pieces 16 to mutually caulk the split iron core pieces 16 arranged on the lower and upper sides. This work is repeated until a necessary thickness is reached, and the annular intermediate body 2A shown in FIG. 4 is obtained. Such work is done in a die unit.

In the annular intermediate body 2A obtained in this manner, split cores 11 are mutually connected by a connection projection 22 and a connection recess 32. In addition, FIG. 2 shows the situation in which the single split core 11 during production is removed, and the plurality of split cores 11 shown in FIG. 2 are annularly connected in the die unit.

(Step of Removing Intermediate Body)

Next, the first intermediate body 2A is removed from the die unit. The first intermediate body 2A is ejected by the die unit, thereby removing the first intermediate body 2A. After the first intermediate body 2A is removed, various inspections such as a dimensional inspection or various treatments such as heat treatment are performed as necessary.

(Step of Decoupling Split Core)

Figure 5:
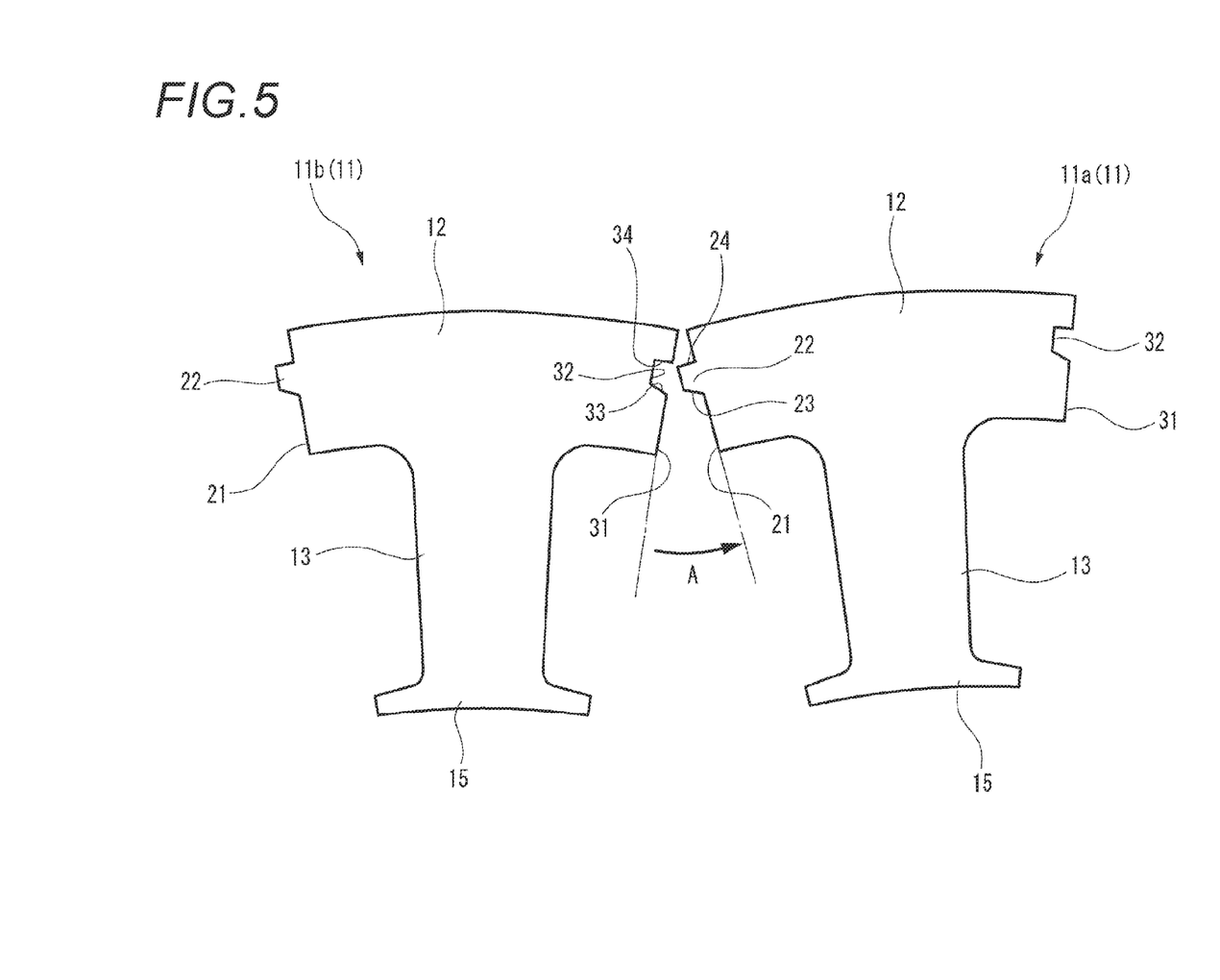
FIG. 5 is an explanatory diagram of a step of decoupling the split cores.

FIG. 5 shows a step of decoupling the split cores 11.

As shown in FIG. 5, the split cores 11 forming the intermediate body 2A are mutually decoupled. Concretely, in the annular intermediate body 2A, the connection projection 22 of a split core 11a is disconnected from the connection recess 32 of an adjacent split core 11b, and the split cores 11 are respectively decoupled.

As shown in FIG. 3, the connection projection 22 and the connection recess 32 have the complementary configurations in which the connection projection 22 and the connection recess 32 are narrowed in width with distance from the coupling surfaces 21, 31. Consequently, in a state of connection between the split cores 11a, 11b, the state of connection between the split cores 11a, 11b is not maintained by mesh of the connection projection 22 and the connection recess 32. That is, the state of connection between the split cores 11a, 11b is not maintained by mesh of a first inside friction surface 23 and a second inside friction surface 33 and mesh of a first outside friction surface 24 and a second outside friction surface 34. The state of connection between the split cores 11a, 11b is maintained by a force of friction between the first inside friction surface 23 and the second inside friction surface 33 and a force of friction between the first outside friction surface 24 and the second outside friction surface 34.

In order to decouple the split cores 11a, 11b as shown in FIG. 5 from the state of connection in FIG. 3, the forces of friction are simply prevented from being produced by separating the first inside friction surface 23 from the second inside friction surface 33 and separating the first outside friction surface 24 from the second outside friction surface 34. In the embodiment, the first inside friction surface 23 and the second inside friction surface 33 are inclined relative to the first virtual normal line PL1.

Accordingly, as shown in FIG. 5, when one split core 11a is rotated in a direction of arrow A, the first inside friction surface 23 does not interfere with the second inside friction surface 33, and the first outside friction surface 24 does not interfere with the second outside friction surface 34. Such an operation can decouple the first inside friction surface 23 from the second inside friction surface 33 and decouple the first outside friction surface 24 from the second outside friction surface 34 without causing interference between the first inside friction surface 23 and the second inside friction surface 33 and interference between the second inside friction surface 24 and the second outside friction surface 34, thus easily decoupling the split cores 11a, 11b.

Also, in the embodiment, the first inside friction surface 23 of the connection projection 22 is inclined relative to the first virtual normal line PL1, and the first outside friction surface 24 of the connection projection 22 is parallel to the second virtual normal line PL2. The second inside friction surface 33 of the connection recess 32 is inclined relative to the first virtual normal line PL1, and the second outside friction surface 34 of the connection recess 32 is parallel to the first virtual normal line PL1 and the second virtual normal line PL2.

Consequently, in the embodiment, the split core 11a is moved along the first inside friction surface 23 and the second inside friction surface 24, thereby enabling the connection projection 22 to be disconnected from the connection recess 32. However, when the split core 11a attempts to be moved along the first outside friction surface 24 and the second outside friction surface 34, this movement is inhibited by interference between the split cores 11a, 11b, or action of the force of friction between the friction surfaces 23, 33 or the force of friction between the friction surfaces 24, 34. That is, a direction of disconnection of the state of connection between the split cores 11a, 11b is determined. This can easily maintain the state of connection between the split cores.

Also, in the embodiment, the first inside friction surface 23 and the second inside friction surface 33 are inclined steeper toward an outer diameter side of the annular core 2. This can easily decouple the split cores 11 by locating the center of rotation outside an outer peripheral surface of the annular core 2 and rotating the split cores 11 around this center of rotation.

(Step of Winding Wire)

Figure 6:
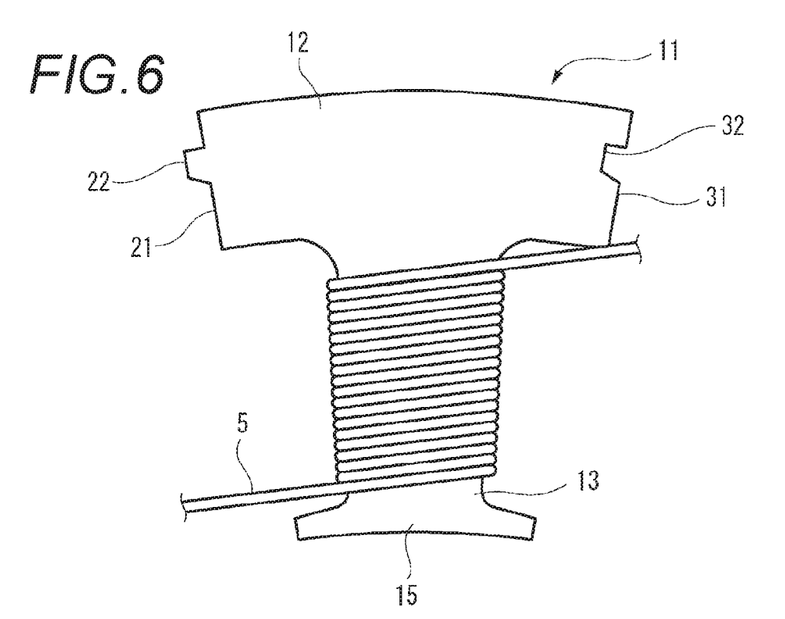
FIG. 6 is an explanatory diagram of a step of winding a winding wire on the split core.

FIG. 6 shows a step of winding a winding wire 5 on the split core 11.

As shown in FIG. 6, the winding wire 5 is wound on each of the tooth portions 13 of the decoupled split cores 11. Each of the split cores 11 is decoupled. This can easily wind the winding wire 5 on each of the tooth portions 13.

(Step of Assembling Annular Core)

Figure 7:
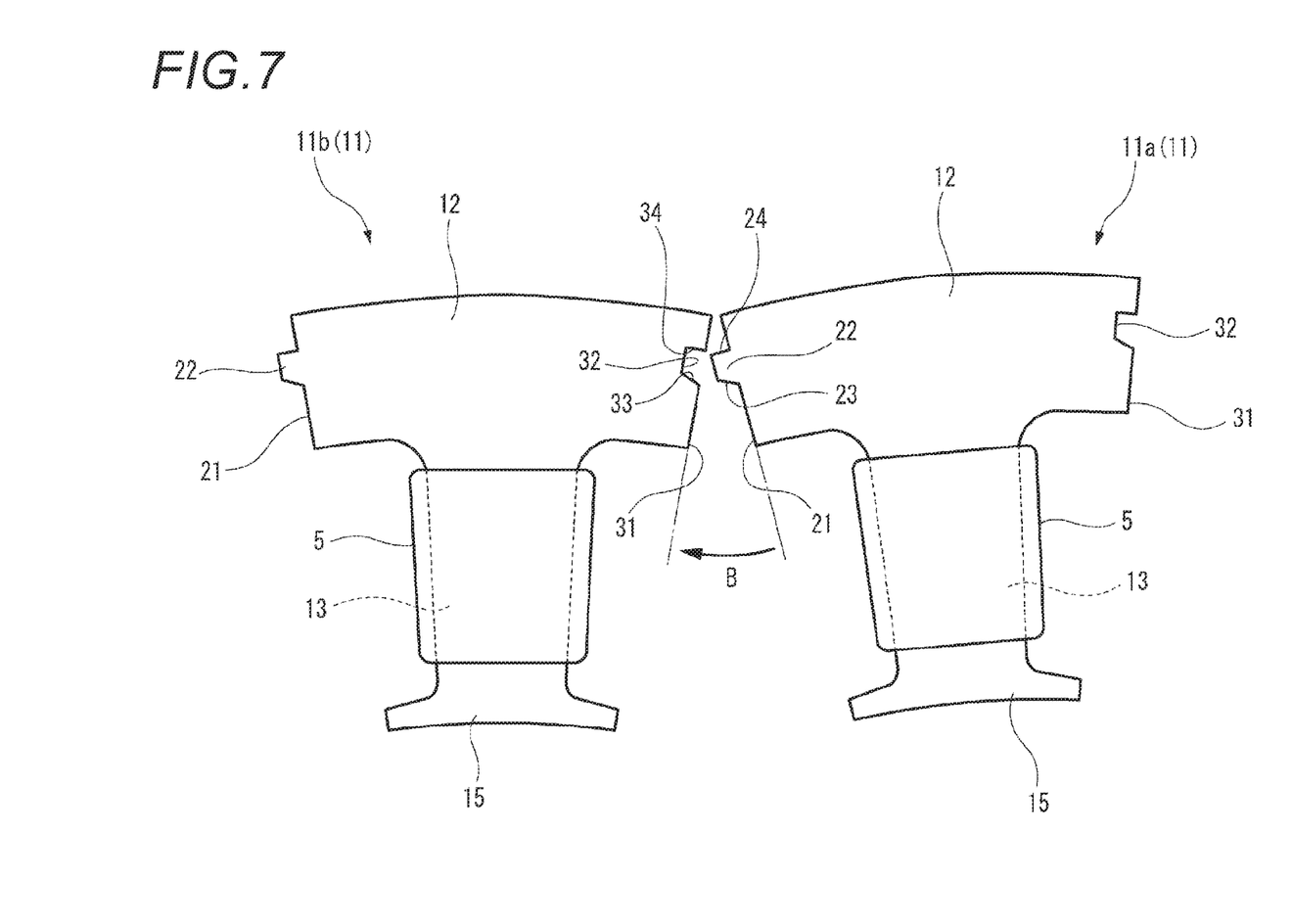
FIG. 7 is an explanatory diagram of a step of connecting the split cores.

FIG. 7 shows a step of mutually connecting the split cores 11 and assembling the annular core 2. As shown in FIG. 7, the split cores 11 with the winding wires 5 wound on the tooth portions 13 are annularly connected to obtain the annular core 2 (see FIG. 1).

As shown in FIG. 7, one split core 11a is rotated in a direction of arrow B to mutually connect the split cores 11a, 11b. This direction of arrow B is opposite to the direction of arrow A shown in FIG. 5.

At this time, the connection projection 22 and the connection recess 32 are narrowed in width with distance from the coupling surfaces 21, 31. The friction surfaces 23, 24, 33, 34 of the connection projection 22 and the connection recess 32 do not mesh and interfere with each other. This can easily insert the connection projection 22 into the connection recess 32 to mutually connect the split cores 11.

As described above, according to the armature 1 and the method for producing the armature according to the embodiment, the connection projection 22 and the connection recess 32 have the complementary configurations in which the connection projection 22 and the connection recess 32 are narrowed in width with distance from the coupling surfaces 21, 31, and the first inside friction surface 23 and the second inside friction surface 33 are inclined relative to the first virtual normal line PL1. This resists decoupling the split cores 11 unless the split core 11 is moved in the determined direction (for example, the direction of arrow A described above) in which interference between the first inside friction surface 23 and the second inside friction surface 33 and interference between the first outside friction surface 24 and the second outside friction surface 34 do not occur.

Also, the force of friction between the first inside friction surface 23 and the second inside friction surface 33 and the force of friction between the first outside friction surface 24 and the second outside friction surface 34 can obtain an adequate strength of connection.

This resists decoupling the split cores 11 even when the first intermediate body 2A is removed from the die unit and also an unintended external force is applied during conveyance, various inspections or various treatments after the removal.

Also, in the embodiment, when the split core 11a is rotated in the direction of arrow A, the split cores 11a, 11b can easily be decoupled. However, when the split core 11 attempts to be moved in other directions, this movement of the split core 11 is inhibited by interference between the first inside friction surface 23 and the second inside friction surface 33 or interference between the first outside friction surface 24 and the second outside friction surface 34. That is, the direction of disconnection of the state of connection between the connection projection 22 and the connection recess 32 is determined. This can easily maintain the state of connection between the split cores 11 even when an unintended external force is applied.

Also, according to the armature 1 and the method for producing the armature according to the embodiment, the connection projection 22 and the connection recess 32 have the complementary configurations in which the connection projection 22 and the connection recess 32 are narrowed in width with distance from the coupling surfaces 21, 31, and the first inside friction surface 23 and the second inside friction surface 33 are inclined relative to the first virtual normal line PL1.

Consequently, the state of connection between the split cores 11 is not maintained by the mesh of the first inside friction surface 23 and the second inside friction surface 33, and the state of connection between the split cores 11 is maintained by the force of friction between the first inside friction surface 23 and the second inside friction surface 33 and the force of friction between the first outside friction surface 24 and the second outside friction surface 33.

This can easily decouple and connect the split cores 11 by moving the split core 11 in the determined direction (for example, the direction of arrow A or arrow B described above) in which interference between the first inside friction surface 23 and the second inside friction surface 33 and interference between the first outside friction surface 24 and the second outside friction surface 34 do not occur.

Thus, the armature 1 and the method for producing the armature according to the embodiment can easily maintain the state of connection between the split cores 11 even when the unintended external force is applied, and can easily decouple and connect the split cores 11.

Also, in the embodiment, the first inside friction surface 23, the first outside friction surface 24, the second inside friction surface 33 and the second outside friction surface 34 are formed of flat surfaces. These friction surfaces 23, 24, 33, 34 can easily be processed to be formed inexpensively with high accuracy.

In addition, in the embodiment, the force of friction between the first inside friction surface 23 and the second inside friction surface 33 and the force of friction between the first outside friction surface 24 and the second outside friction surface 34 can easily be adjusted by the size of each of the friction surfaces, the height of the connection projection 22, and the depth of the connection recess 32. For example, increases in the height of the connection projection 22 and the depth of the connection recess 32 can increase the area of contact between the first inside friction surface 23 and the second inside friction surface 33. An increase in the area of contact between the first outside friction surface 24 and the second outside friction surface 34 can set a great force of friction, thereby increasing the strength of connection between the split cores 11.

The present invention is not limited to the embodiment described above, and various modified examples can be applied within the scope of the present invention.

Next, armatures according to various modified examples will be described.

Description is omitted by assigning the same numerals or signs to the same components as those of the embodiment described above.

First Modified Example

Figure 8:
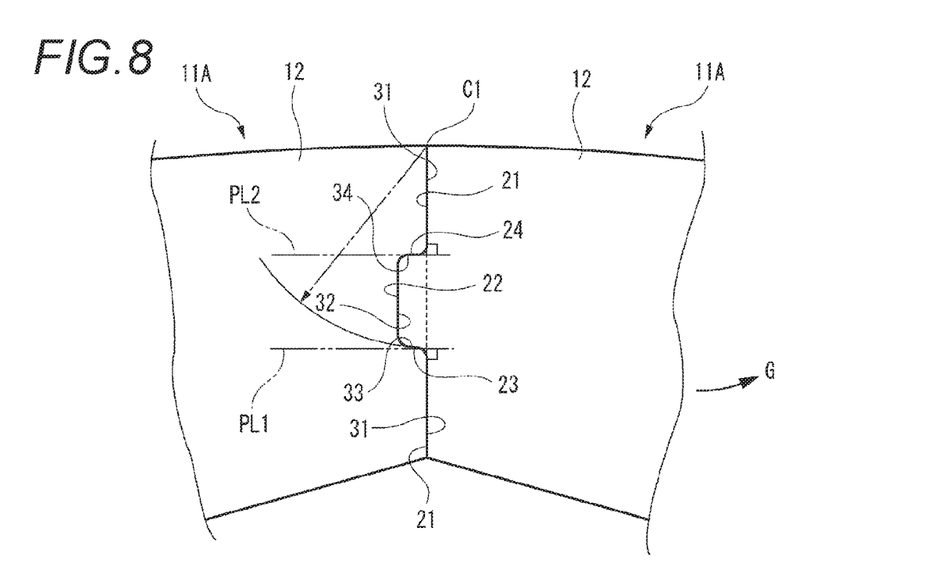
FIG. 8 is an enlarged plan view of a place of connection between split cores according to a first modified example of the present invention.

FIG. 8 is an enlarged plan view of a place of connection between split cores 11A according to a first modified example of the present invention.

In the embodiment described above, the first inside friction surface 23 and the second inside friction surface 33 are formed of the flat surfaces, but the present invention is not limited to this. As shown in FIG. 8, in the first modified example, a first inside friction surface 23 and a second inside friction surface 33 are formed of curved surfaces. Each of the first inside friction surface 23 and the second inside friction surface 33 has a circular arc shape around a point C1 located at an outer peripheral end of each of coupling surfaces 21, 31 of the split cores 11A.

According to this first modified example, the first inside friction surface 23 and the second inside friction surface 33 are formed of the curved surfaces. This can more easily avoid interference between the first inside friction surface 23 and the second inside friction surface 33 when the split core 11A is rotated to decouple the split cores 11A. In the illustrated example, when the split core 11A is rotated in a direction of arrow G around the point C1, the split cores 11A do not interfere with each other. This can easily decouple both of the split cores 11A.

In addition, the first inside friction surface 23 and the second inside friction surface 33 may be formed of only the flat surfaces, only the curved surfaces, or the flat surface and the curved surface.

Second Modified Example

Figure 9:
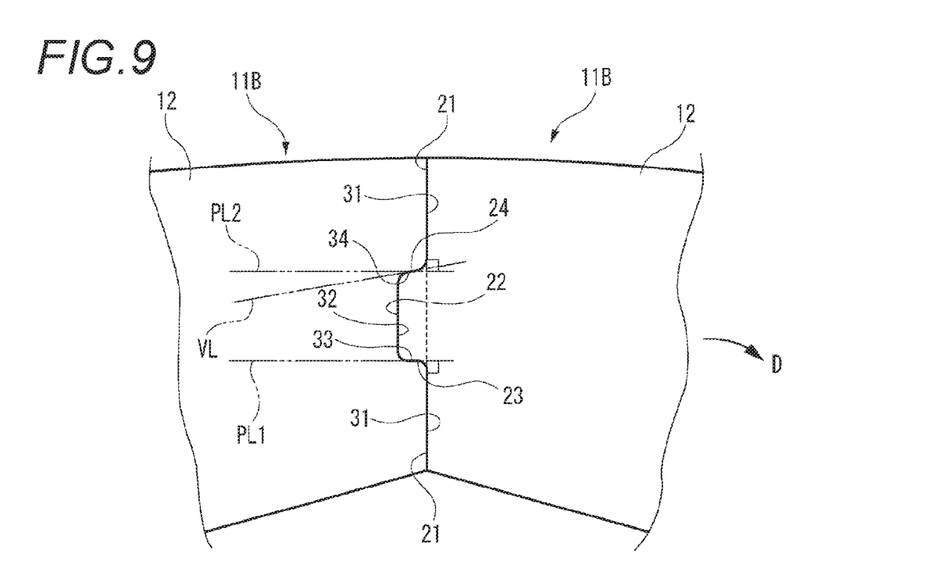
FIG. 9 is an enlarged plan view of a place of connection between split cores according to a second modified example of the present invention.

FIG. 9 is an enlarged plan view of a place of connection between split cores 11B according to a second modified example of the present invention.

The embodiment described above describes the example in which the first inside friction surface 23 and the second inside friction surface 33 located in an inner diameter side of the annular core 2 are inclined relative to the first virtual normal line PL1, but the present invention is not limited to this example. As shown in the second modified example of FIG. 9, a first outside friction surface 24 and a second outside friction surface 34 located in an outer diameter side of an annular core 2 may be inclined relative to a second virtual normal line PL2, and a first inside friction surface 23 and a second inside friction surface 33 located in an inner diameter side of the annular core 2 may be parallel to a first virtual normal line PL1. In addition, in FIG. 9, a direction in which the first outside friction surface 24 and the second outside friction surface 34 extend is shown by a virtual line VL.

According to this second modified example, a state of connection between the split cores 11B can easily be maintained by a force of friction between the first inside friction surface 23 and the second inside friction surface 33 and a force of friction between the first outside friction surface 24 and the second outside friction surface 34. Also, when the split core 11B is rotated in a direction of arrow D, the state of connection between the split cores 11B can be disconnected, but movement of the split core 11B in other directions is inhibited. This can easily decouple and connect the split cores 11B while preventing unintended decoupling of the split cores 11B.

Third Modified Example

Figure 10:
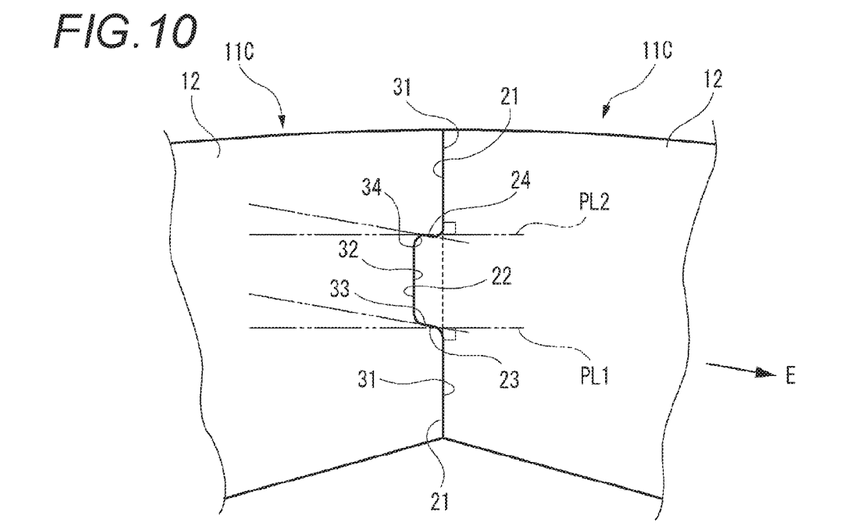
FIG. 10 is an enlarged plan view of a place of connection between split cores according to a third modified example of the present invention.

FIG. 10 is an enlarged plan view of a place of connection between split cores 11C according to a third modified example of the present invention.

In the embodiment described above, only the first inside friction surface 23 and the second inside friction surface 33 located in the inner diameter side of the annular core 2 are inclined relative to the first virtual normal line PL1, but the present invention is not limited to this. As shown in the third modified example of FIG. 10, a first inside friction surface 23 and a second inside friction surface 33 may be inclined relative to a first virtual normal line PL1, and a first outside friction surface 24 and a second outside friction surface 34 may be inclined relative to a second virtual normal line PL2. The first inside friction surface 23, the second inside friction surface 33, the first outside friction surface 24 and the second outside friction surface 34 are inclined steeper toward an outer diameter side of an annular core 2 with distance from coupling surfaces 21, 31.

According to this third modified example, parallel movement of the split core 11C in a direction of arrow E can separate the first inside friction surface 23 from the second inside friction surface 33 and separate the first outside friction surface 24 from the second outside friction surface 34, thus decoupling the split cores 11C, 11C. Also, movement of the split core 11 in a direction opposite to the direction of arrow E can easily connect the split cores 11C, 11C.

Fourth Modified Example

Figure 11:
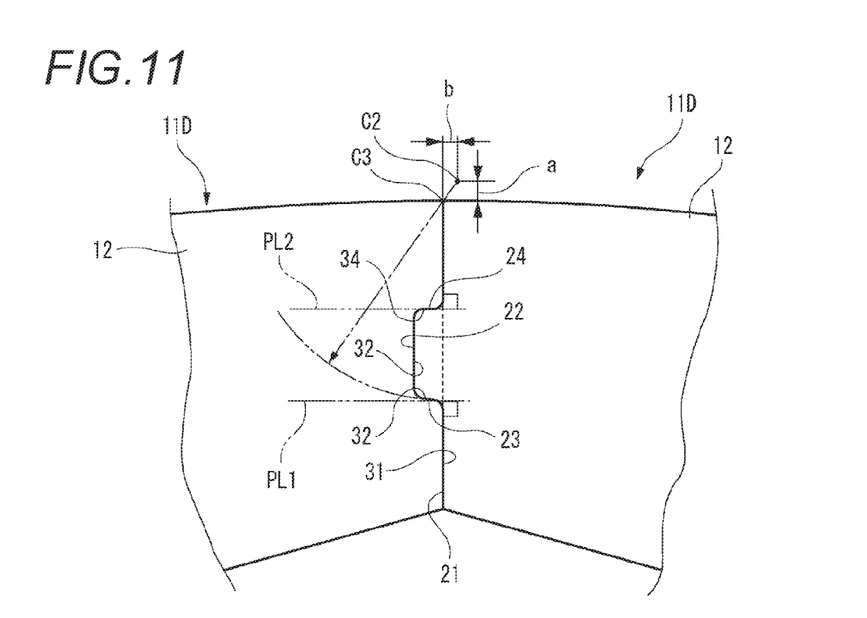
FIG. 11 is an enlarged plan view of a place of connection between split cores according to a fourth modified example of the present invention.

FIG. 11 is an enlarged plan view of a place of connection between split cores 11D according to a fourth modified example of the present invention.

As shown in FIG. 11, in the fourth modified example, a first inside friction surface 23 and a second inside friction surface 33 inclined relative to a first virtual normal line PL1 are formed of curved surfaces having circular arc shapes around a point C2. In a cross sectional plane perpendicular to a center axis line C of an annular core 2, the center C2 of the circular arc is located at an outer-diameter end C3 of coupling surfaces 21, 31, or a place separated from the outer-diameter end C3 of the coupling surfaces 21, 31 away from a connection projection 22 and a connection recess 32 by a dimension a along a radial direction of the annular core 2 (a≥0). And, in the cross sectional plane perpendicular to the center axis line C of an annular core 2, the center C2 of the circular arc is located in the coupling surfaces 21, 31, or a place separated from the coupling surfaces 21, 31 away from the connection projection 22 and the connection recess 32 by a dimension b along a circumferential direction of the annular core 2 (b≥0).

Unlike the illustrated example, when the center C2 of the circular arc is set inside an outer peripheral surface of the annular core 2, there is a fear that the split cores 11D interfere with each other and cannot be decoupled smoothly at the time of decoupling the split cores 11D.

On the other hand, according to the fourth modified example, the center C2 of the circular arc of the first inside friction surface 23 and the second inside friction surface 33 is located in the outer peripheral surface of the annular core 2, or a place separated from this outer peripheral surface. Consequently, when the split core 11D is rotated around the center C2 of the circular arc located in the outer peripheral surface of the annular core 2 or the center C2 of the circular are located in the place separated from this outer peripheral surface at the time of decoupling the split cores 11D, the first inside friction surface 23 and the second inside friction surface 33 do not interfere with each other. Moreover, an outer diameter side of the annular core 2 has large working space. This provides good workability at the time of decoupling the split cores 11D.

Figure 12:
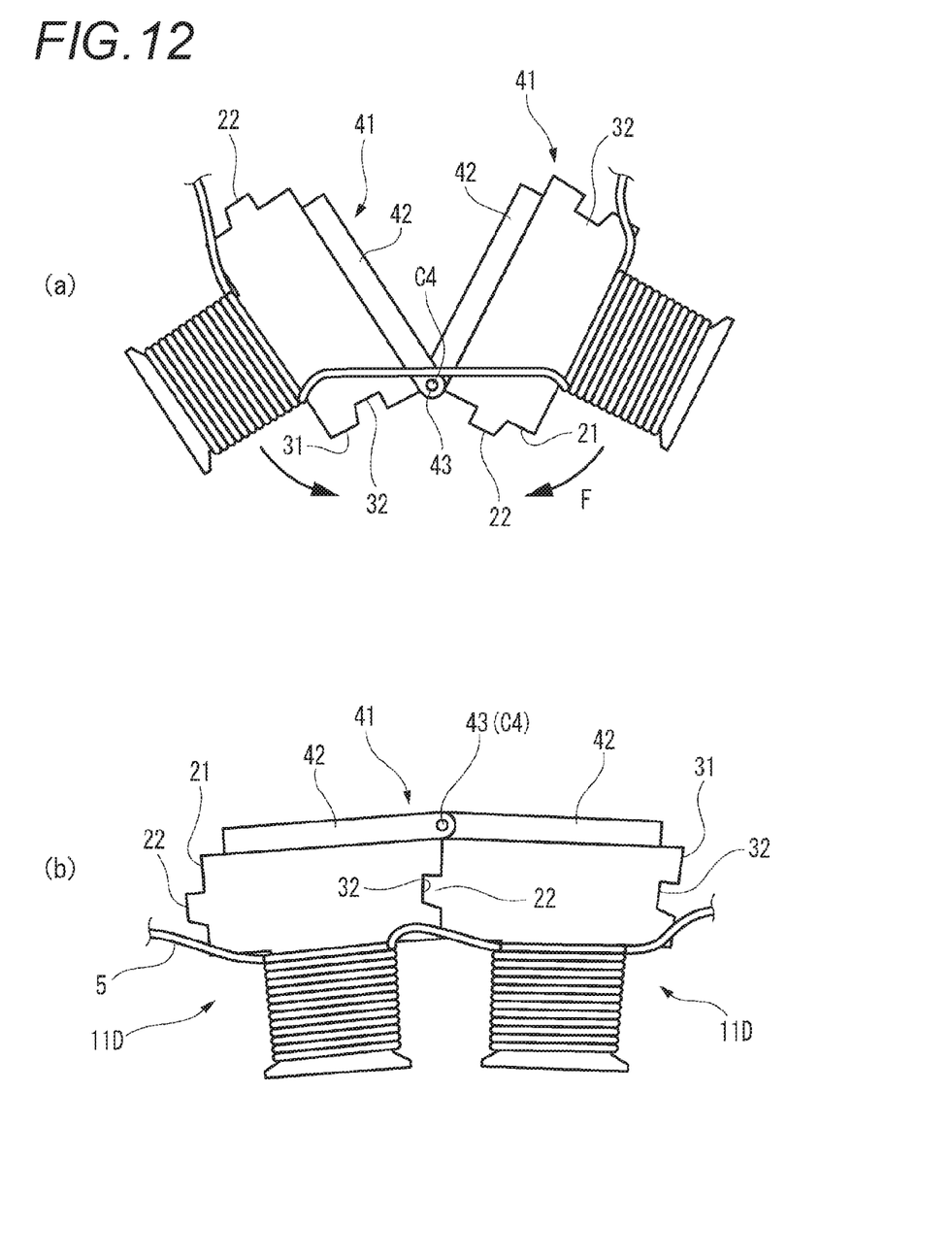
FIG. 12 is an explanatory diagram of work of connecting the split cores of the fourth modified example using a jig.

FIG. 12 is an explanatory diagram of work of connecting the split cores 11D of the fourth modified example using a jig 41. FIG. 12(a) shows a state before connection between the split cores 11D, and FIG. 12(b) shows a state after connection between the split cores 11D.

As shown in FIG. 12(a) and FIG. 12(b), work of connecting the split cores 11D can easily be done by attaching the jig 41 to the two adjacent split cores 11D. This jig 41 includes fixing pieces 42 fixed to outer peripheral surfaces of the respective split cores 11D. The ends of these fixing pieces 42 are rotatably connected by a pin 43. In this jig 41, the center C4 of rotation in the pin 43 coincides with the center C2 of the circular arc of the first inside friction surface 23 and the second inside friction surface 33.

Thus, in the fourth modified example, when the jig 41 is attached to the adjacent split cores 11D and also the fixing pieces 42 of the jig 41 are rotated in a direction of arrow F around the pin 43, the split cores 11D can easily be connected as shown in FIG. 12(a).

This application is based on Japanese patent application No. 2015-168117 filed on Aug. 27, 2015, the contents of which are hereby incorporated by reference.

INDUSTRIAL APPLICABILITY

The present invention provides an armature with increased production efficiency, and a method for producing the armature.

REFERENCE SIGNS LIST

1: ARMATURE
2: ANNULAR CORE
2A: INTERMEDIATE BODY
5: WINDING WIRE
11: SPLIT CORE
21, 31: COUPLING SURFACE
22: CONNECTION PROJECTION
23: FIRST INSIDE FRICTION SURFACE
24: FIRST OUTSIDE FRICTION SURFACE
33: SECOND INSIDE FRICTION SURFACE
34: SECOND OUTSIDE FRICTION SURFACE
32: CONNECTION RECESS
PL1: FIRST VIRTUAL NORMAL LINE
PL2: SECOND VIRTUAL NORMAL LINE

The invention claimed is:

1. An armature for an electric motor or a generator, the armature comprising:
  a plurality of split cores mutually connected to form an annular core; and
  a winding wire wound on each of the split cores,
  wherein a connection projection and a connection recess are formed on coupling surfaces located on both ends of each of the split cores in a circumferential direction to mutually connect adjacent ones of the split cores, and
  wherein, in a cross sectional plane perpendicular to a center axis line of the annular core:
    the connection projection and the connection recess have complementary configurations in which the connection projection and the connection recess are narrowed in width with distance from the coupling surfaces;
    each of the connection projection and the connection recess includes a pair of friction surfaces extending in a direction separate from the coupling surfaces;
    at least one of the pair of friction surfaces of the connection projection is inclined relative to a virtual normal line that is perpendicular to a line connecting bottom portions of the pair of friction surfaces of the connection projection; and
    at least one of the pair of friction surfaces of the connection recess is inclined relative to a virtual normal line that is perpendicular to a line connecting bottom portions of the pair of friction surfaces of the connection recess.

2. The armature according to claim 1, wherein
one of the pair of friction surfaces of the connection projection is inclined relative to the virtual normal line that is perpendicular to the line connecting bottom portions of the pair of friction surfaces of the connection projection,
the other of the pair of friction surfaces of the connection projection is parallel to the virtual normal line,
one of the pair of friction surfaces of the connection recess is inclined relative to the virtual normal line, and
the other of the pair of friction surfaces of the connection recess is parallel to the virtual normal line.

3. The armature according to claim 1, wherein the friction surface inclined relative to the virtual normal line is inclined steeper toward an outer diameter side or an inner diameter side of the annular core with distance from the coupling surfaces of the connection projection and the connection recess.

4. The armature according to claim 1, wherein the friction surface inclined relative to the virtual normal line is formed of a flat surface.

5. The armature according to claim 1, wherein the friction surface inclined relative to the virtual normal line is formed of a curved surface.

6. The armature according to claim 1, wherein the friction surface inclined relative to the virtual normal line is formed of a circular arc, and in the cross sectional plane perpendicular to the center axis line of the annular core, a center of the circular arc is located at:
a radial end of the coupling surface or a place separated from the radial end of the coupling surface away from the connection projection and the connection recess along a radial direction of the annular core; and
the coupling surface or a place separated from the coupling surface away from the connection projection and the connection recess along a circumferential direction of the annular core.

7. The armature according to claim 6, wherein the friction surface having a circular arc shape is located in an inner diameter side of the pair of friction surfaces, and in the cross sectional plane perpendicular to the center axis line of the annular core, a center of the friction surface is located outside an outer-diameter end of the coupling surface along the radial direction of the annular core and a place separated from the coupling surface away from the connection projection and the connection recess along a circumferential direction of the annular core.

8. A method for producing an armature for an electric motor or a generator including a plurality of split cores mutually connected to form an annular core, the method comprising the steps of:
connecting a connection projection and a connection recess formed on coupling surfaces located on both ends of each of the split cores in a circumferential direction to the connection recess and the connection projection of an adjacent one of the split cores in a die unit, thereby obtaining a first intermediate body in which the split cores are annularly connected;
removing the first intermediate body from the die unit;
disconnecting the connection projection from the connection recess in adjacent ones of the split cores and decoupling the split cores;
winding a wire on each of the decoupled split cores; and
inserting the connection projection of each of the split cores into the connection projection of the adjacent one of the split cores to reconnect the split cores, thereby obtaining the annular core,
wherein, in a cross sectional plane perpendicular to a center axis line of the annular core:
the connection projection and the connection recess have complementary configurations in which the connection projection and the connection recess are narrowed in width with distance from the coupling surfaces;
each of the connection projection and the connection recess includes a pair of friction surfaces extending in a direction separate from the coupling surfaces;
at least one of the pair of friction surfaces of the connection projection is inclined relative to a virtual normal line that is perpendicular to a line connecting bottom portions of the pair of friction surfaces of the connection projection; and
at least one of the pair of friction surfaces of the connection recess is inclined relative to a virtual normal line that is perpendicular to a line connecting bottom portions of the pair of friction surfaces of the connection recess.

* * * * *